United States Patent

Henson

[11] 4,055,907
[45] Nov. 1, 1977

[54] CHARACTER SCANNED TEACHING MACHINE

[76] Inventor: Eugene Murl Henson, 14256 Caminata Soleado, San Diego, Calif. 92129

[21] Appl. No.: 694,232

[22] Filed: June 9, 1976

[51] Int. Cl.² .............................................. G09B 7/02
[52] U.S. Cl. ........................................ 35/9 R; 35/6
[58] Field of Search ................... 35/6, 8 R, 8 A, 9 R, 35/9 A, 9 B, 48 R; 340/172.5, 324 AD, 324 A, 324 M

[56] References Cited

U.S. PATENT DOCUMENTS

| | | | |
|---|---|---|---|
| 3,383,781 | 5/1968 | Diuzet | 35/9 A |
| 3,405,457 | 10/1968 | Bitzer | 35/9 A |
| 3,477,142 | 11/1969 | Cornell et al. | 35/9 A |
| 3,598,911 | 8/1971 | Helbig | 340/324 AD |
| 3,623,157 | 11/1971 | Stapleford | 35/9 A |
| 3,832,790 | 9/1974 | Fryer et al. | 35/8 R |
| 3,874,669 | 4/1975 | Ariano | 340/324 A X |
| 3,894,346 | 7/1975 | Ward et al. | 35/6 X |
| 3,953,929 | 5/1976 | Hansel | 35/9 A X |
| 3,974,575 | 8/1976 | Duncan | 35/9 A |
| 4,010,556 | 3/1977 | Ellsworth et al. | 35/30 |

Primary Examiner—Richard C. Pinkham
Assistant Examiner—Vance Y. Hum
Attorney, Agent, or Firm—Brown & Martin

[57] ABSTRACT

A teaching machine wherein an answer provided by a student in the form of a sequence of characters is displayed as each character is correctly indicated in said sequence by the student as determined by a character by character comparison of input character indications made by the student with a correct character indication sequence stored in the machine. A single character generator may be used to provide character forming signals for forming characters in a plurality of dot matrix display devices. The character generator receives input character indications from a temporary memory in which each character indication position is addressed while the character generator is providing character forming signals for the same corresponding row of all of the display devices.

9 Claims, 4 Drawing Figures

CHARACTER SCANNED TEACHING MACHINE

BACKGROUND OF THE INVENTION

The present invention generally pertains to teaching machines utilizing electronic data processing circuits and is particularly directed to the type of teaching machine wherein the machine responds to an answer provided by a student by indicating whether or not the answer is correct.

In many prior art teaching machines of this type the student is provided with the question and a plurality of predetermined answer choices from which to choose. The answer is generally provided by the student operating some type of input device such as a keyboard on which the keys correspond to the predetermined answer choices. The machine then compares the answer indication provided by the student with a correct answer indication stored in the machine, and provides a response indicating the correctness of the student's answer. In some machines the response takes the form of the machine advancing to a presentation of another question, thereby indicating that the answer provided by the student was correct, or, alternatively, of the machine doing absolutely nothing, thereby indicating to the student that the indicated answer that he has provided was incorrect and that he should select a different one of predetermined answer choices.

However teaching machines presenting predetermined answer choices to the student are not as well suited for teaching some subjects, such as spelling, as are machines in which no predetermined choices are provided; but instead, the student must create the answer to be provided. With this latter type of machine, when the student is requested to spell a given word, the student must correctly provide indications of all of the words characters in their proper sequence. In such a machine each indicated character is compared with a correct character indication sequence stored in the machine on a character by character basis.

It is desired that the characters be displayed as they are correctly indicated in sequence in order to provide to the student reinforcement that he is proceeding correctly with his answer. Typically, a prior art character display devices displays each character in a dot matrix format consisting of rows and columns. Each row of the character is formed by a signal from a character generator which generates such character forming signals on a row by row basis in response to an input character indication. Separate character generators and such associated components as storage registers are included for each character position in the display sequence. Although such a display could be readily provided by those teaching machines wherein a stand alone large capacity digital computer is accessed by a keyboard, it heretofore has not been available in relatively less expensive fully portable teaching machines, such as those wherein a plurality of predetermined answer choices are provided.

SUMMARY OF THE INVENTION

In accordance with the present invention there is provided a relatively less expensive teaching machine that may be fully portable, wherein an answer provided by a student in the form of a sequence of characters is displayed as each character is correctly indicated in sequence by the student. Whether or not the character has been correctly indicated is determined by a character by character comparison which is made between input character indications made by the student and a correct character indication sequence stored in the machine. The present invention is characterized by the use of a temporary memory in combination with particular scanning and addressing steps in the machines operation which enable a plurality of characters to be apparently simultaneously displayed from only a single character generator, thereby providing a significant reduction in the number and cost of machine components.

Essentially the teaching machine of the present invention includes the following elements. There is an input device, such as a keyboard for providing an input character indication, and a permanent memory for storing a correct character indication sequence. A comparison circuit compares the input character indication with a stored character indication in a corresponding position in the stored correct character indication sequence, and provides an enabling signal when the input character indication matches the stored correct character indication. A temporary memory stores correct input character indications in response to the enabling signal in the sequence that the characters are correctly indicated at the input device.

A sequence of display devices display characters represented by the input character indications that are stored in the temporary memory. Each character is displayed in a matrix format consisting of rows and columns. There also is a sequence of storage registers corresponding to the sequence of display devices. Each storage register holds and provides signals to its corresponding display device for forming a character represented by an input character indication in the corresponding character sequence position in the temporary memory. A character generator provides the character forming signals to the storage registers in response to input character indications received from the temporary memory. Each character forming signal represents a single row of a character matrix.

A character scanning device sequentially addresses each character indication position in the temporary memory to provide the character indication in the addressed position to the character generator. A character enabling circuit enables the storage registers to provide character forming signals to the corresponding display devices in the sequence and at the rate that the corresponding character positions in the temporary memory are being addressed.

A row scanning device provides row by row scanning of the character generator for providing character forming signals representing a single row of the indicated character matricies to the storage registers. A row enabling circuit enables all of the display devices to display corresponding single rows of the character matricies at the same rate that the character generator is scanned by the row scanning circuit and at such a rate that signals are received by all of the storage registers from the character generator during the scanning of each row. All of the scanning is done at such rates that all of the characters appear to be wholly displayed simultaneously.

Preferably the teaching machine further includes a circuit for enabling the storage registers to receive character forming signals from the character generator during the first half of the interval during which each row is scanned and for enabling the display devices to display the corresponding single rows of the character matricies during the second half of the interval. This feature enables the displayed characters to appear to be flicker free.

Preferably the permanent memory has positions for storing a predetermined number of words each having a sequence of character indications, and a device for sequentially addressing the word positions in the permanent memory. The teaching machine preferably further includes an apparatus such as a tape recorder, for sequentially providing recorded audio messages, each message being related to an addressed word stored in a corresponding word sequence position. In this preferred embodiment, one circuit causes the provided recorded audio message to be repeated periodically until the next word position in the sequence is addressed, and another circuit enables the next word in the sequence to be addressed whenever a correct input character indication sequence for the instantly addressed word is completely provided.

Additional features of the present invention are disclosed in the following detailed description.

BRIEF DESCRIPTION OF THE DRAWINGS

The functional block diagram of FIG. 1 shows the direction of signal flow between only certain ones of the functional elements of the teaching machine; and the flow lines shown therein do not exactly correspond to the various circuit lines shown in the schematic circuit diagram of FIGS. 2A and 2B.

DESCRIPTION OF THE PREFERRED EMBODIMENT

Figure 1:
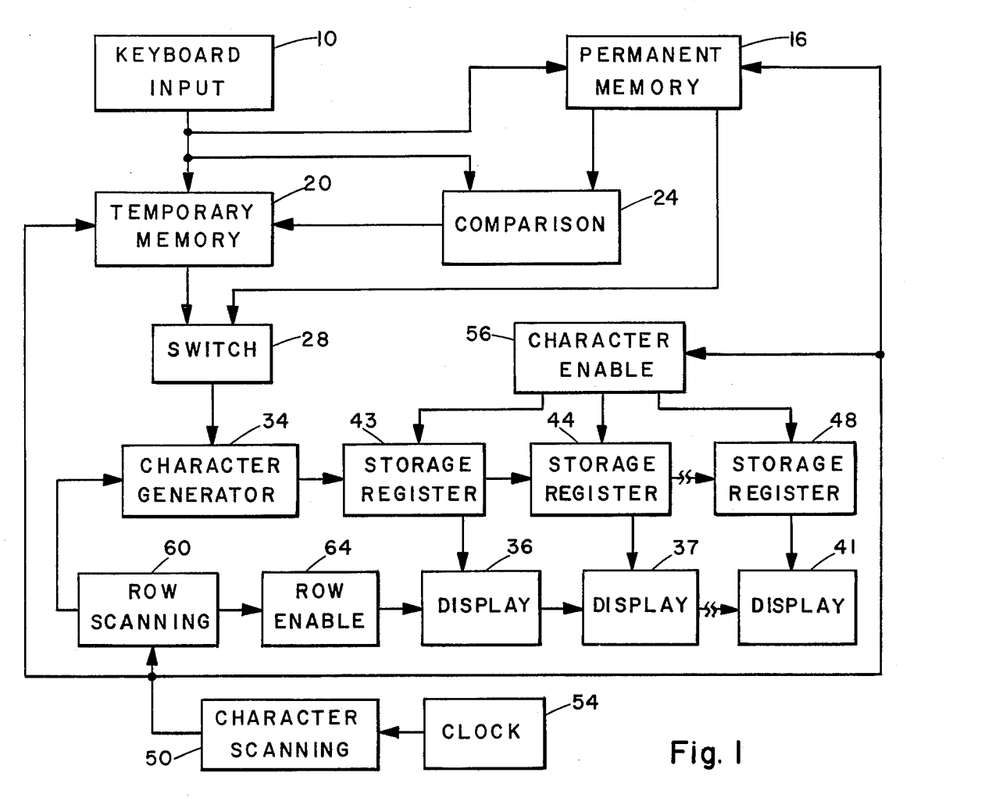
FIG. 1 is a functional block diagram of the teaching machine of the present invention.
Figure 2A:
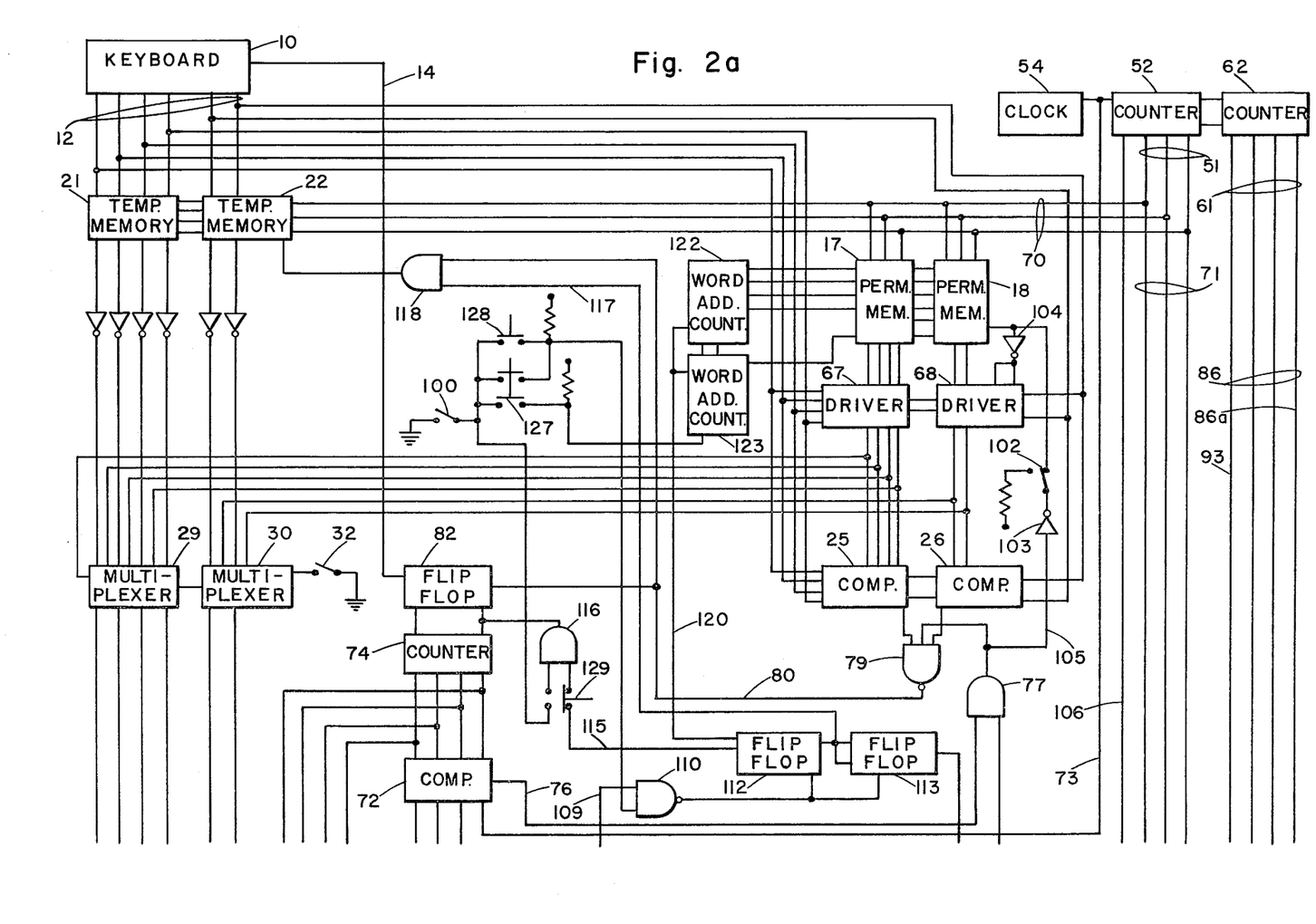
FIG. 2A and 2B are a schematic circuit diagram of a preferred embodiment of the teaching machine of the present invention.
Figure 2B:
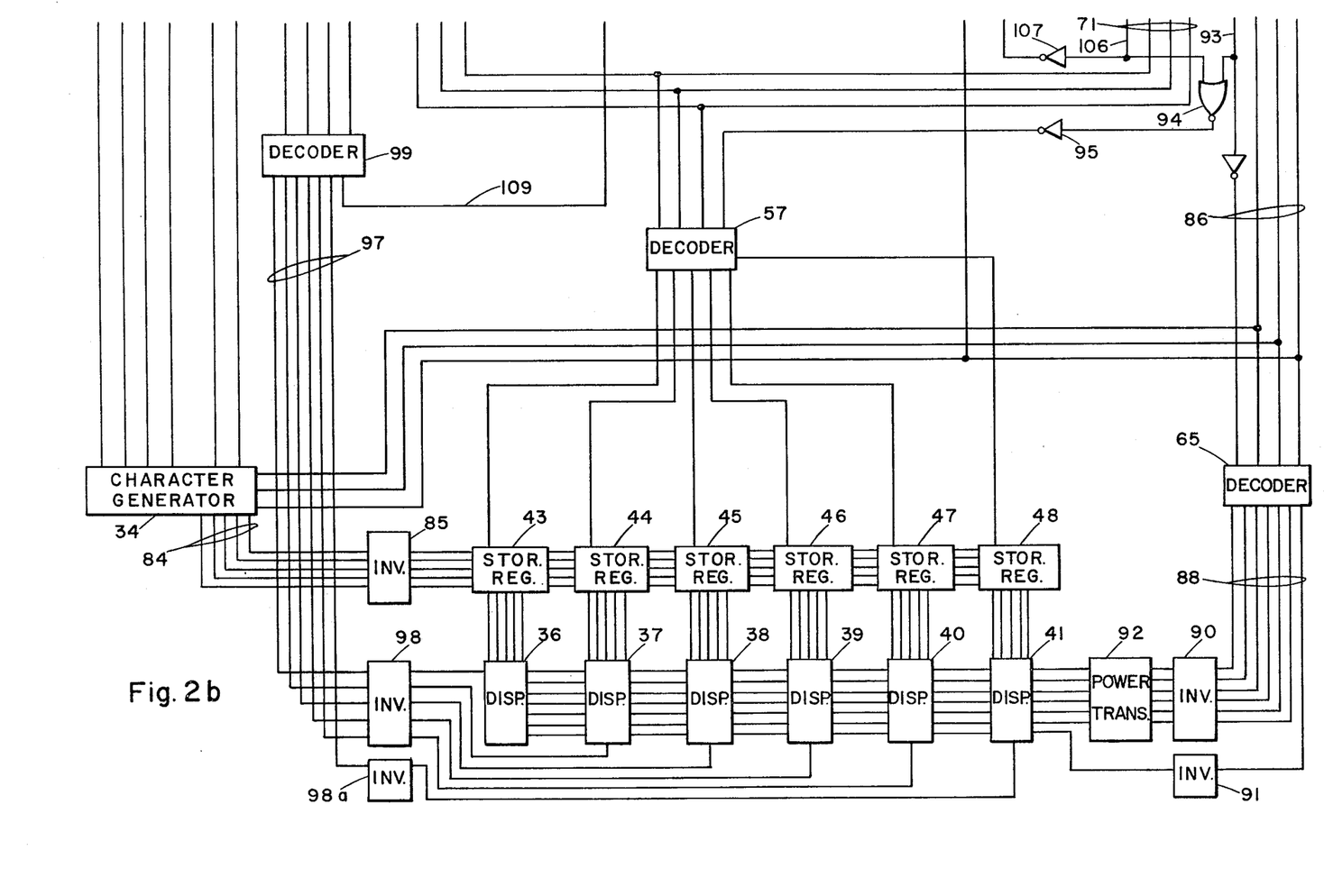

Referring to FIGS. 1, 2A and 2B, the keyboard input 10 is an electronic data processing keyboard which provides a six bit ACS II code input character indication signal at its output on the six lines 12, whenever a character key is depressed. A signal is also provided on a line 14 each time a character key is depressed.

The permanent memory 16 has a capacity for storing 32 seven character words. The permanent memory 16 includes two Signetics No. 2606 integrated circuit memories 17 and 18, each of which has a 256 × 4 bit storage capacity.

The temporary memory 20 has a capacity for storing one six character word. The temporary memory 20 includes two Signetics No. 7489 integrated circuit memories 21 and 22, each of which has a 16 × 4 bit capacity.

The comparison circuit 24 includes two Texas Instruments No. 7485 four bit comparators (integrated circuits) 25 and 26.

The switch 28 includes two Fairchild No. 9322 quad multiplexers (integrated circuits) 29 and 30. When the keyswitch 32 is closed, the switch 28 provides signals from the permanent memory 16 to the character generator 34; and when the keyswitch 32 is open the switch 28 provides signals from the temporary memory 20 to the character generator 34.

The character generator 34 is a Signetics No. 2513 character generator (integrated circuit).

There are six display devices 36, 37, 38, 39, 40, 41. A larger number of display devices can be used in other embodiments if desired. The display devices are light emitting diode (LED) matricies (Texas Instruments No. TIL305 integrated circuits). Although the display devices alternatively could be dedicated locations on a cathode ray tube screen, discrete LED devices are preferred for each character because these devices are more readily adaptable to all of the processing steps employed in the preferred embodiment, as will be described in greater detail somewhat later hereinafter.

There also are six storage registers 43, 44, 45, 46, 47 and 48. Each storage register is one half of a Signetics No. 8201 dual five-bit storage register (integrated circuit).

The character scanning device 50 includes the three nost significant bit positions 51 of a Fairchild No. 9316 four bit counter (integrated circuit) 52. Clocked pulses are provided to the counter 52 by a clock 54. The clock 54 is a Signetics No. 555 free running oscillator (integrated circuit).

The character enabling circuit 56 includes a Fairchild No. 9301 one-of-ten decoder (integrated circuit) 57.

The row scanning device 60 includes the three most significant bit positions 61 of a Fairchild No. 9316 four bit counter (integrated circuit) 62. Clocked pulses are provided to the counter 62 from the counter 52.

The row enabling circuit 64 includes a Fairchild No. 9301 one-of-ten decoder (integrated circuit) 65.

The teaching machine of the present invention can readily be used to teach a subject wherein the student must create his own answer, such as spelling. The teaching machine has two modes of operation, a programming mode and a learning mode. The teacher programs the machine with audio instructions on the recording medium and the corresponding answers in the permanent memory. When the machine is used in the learning mode, by the student, first an audio instruction, such as "spell the word DOLLAR" is heard. Then the student depresses character keys on the keyboard in sequence to spell the specified word. As each character is correctly indicated in sequence, it is displayed. If no character is displayed following depression of a character key, the student knows that his choice was incorrect and that he must select a different character. For example, if after indicating the characters D-O-L-L, (all of which would be displayed), the student depressed the "E" character key, no character would be displayed in the fifth position in the display device sequence. Once he depressed the "A" key, however, an A would be displayed in this position. If the student has not completely spelled the specified word correctly within a given time period, such as 20 seconds, the audio instruction is repeated.

Once the word is completely spelled correctly however, a new audio instruction is given and a new word in the permanent memory is addressed for the student to match by correctly spelling the same.

For a more detailed discussion of the data processing steps that occur during the operation of the machine by the student, reference is made to FIGS. 2A and 2B. When a character key on the keyboard 10 is depressed, the six bit ASC II code input character indication that appears on the lines 12 also appears on one set of inputs to the comparators 25 and 26. The comparators 25 and 26 compare this input character indication with a character indication from the permanent memory 17, 18 which is received at another set of comparators 25, 26 inputs via bi-directional drivers 67, 68. The bi-directional drivers 67, 68 are Signetics Model 8T28 bi-directional drivers (integrated circuits). The word address to the permanent memory is set to address and hold one word. However, the character indication positions in the addressed word are being sequentially addressed repetively by the scanning signal on lines 70 from the counter 52 designating the character position in the sequence. The comparators 25, 26 compare the input character indication from the keyboard 10 with the correct character indications in the character indication positions in the permanent memory 17, 18 as such positions are sequentially addressed.

At the same time as the character indication positions in the permanent memory 17, 18 are being sequentially addressed, the scanning signal on lines 71 is also provided to one set of inputs of a comparator 72. The comparator 72 is a Texas Instruments No. 7485 four bit comparator (integrated circuit).

The comparator 72 is enabled only during the second half of the cycle of the clock signal provided on line 73 from the clock 54. The comparator 72 compares this scanning signal with a signal received at another set of inputs from a counter 74. The counter 74, which is a Fairchild No. 9316 four bit counter (integrated circuit), registers the position in the sequence of the input character indication presently on lines 12 from the keyboard that is being compared by the comparators 25, 26 with the character indications being provided from the sequentially addressed character positions in the permanent memory.

When the scanning signal on line 71 to the comparator 72 matches the registered position in the counter 74, an enabling signal is provided on an output line 76 of the comparator 72, to an AND gate 77, thereby indicating that the character indicated position in the permanent memory then being addressed corresponds to the sequential position of the input character indication. The output line from the AND gate 77 is combined with the output lines from the comparators 25, 26 at a NAND gate 79, such that an enabling signal (indicating that the input character indication matches the stored correct character indication in the corresponding sequential character position) is furnished on line 80 only when both the input character indication matches the stored character indication then being addressed and the registered position of the input character indication matches the position of the stored character indication then being addressed.

The enabling signal on line 80 enables the temporary memory 21, 22 to store the input character indication being received on lines 12 in the character position then being addressed by the scanning signal on lines 70; which position corresponds with the character position in the permanent memory 17, 18 and the registered position in the counter 74 at which the enabling signal on line 80 was produced.

The enabling signal on line 80 is also furnished to reset a flip-flop 82, so as to cause the counter 74 to advance the count of the registered position; the flip-flop 82 having been set by a signal provided on the line 14 when a character indication key on the keyboard 10 was depressed. The address of the first character indication position in the counter 74 is a combination of binary low signals in each bit position.

The same processing steps are repeated for all of the characters in the sequence.

The LED display devices 36-41 display characters represented by the character indications stored in the temporary memory 21, 22. Each display is a 5 by 7 dot matrix. The character generator 34 provides a character forming signal on lines 84 through a Texas Instruments Model 7404 hex-inverter (integrated circuit) 85 to all of the storage registers 43-48. The character forming signal however, is stored in only that storage register which is enabled by a signal from the decoder 57. The decoder 57 enables the storage register in the character indication position that is indicated by the scanning signal on the lines 71. The character forming signal provided by the character generator 34 forms one row of a character represented by the character indication stored in that position in the temporary memory 21, 22 that is being addressed by the scanning signal on the lines 70, which signal is identical to the signal on the lines 71. Thus, the storage register 43 in the first sequential position receives and holds a character forming signal which corresponds to the character indication stored in the first sequential position in the temporary memory 21, 22.

Although the character generator 34 generates character forming signals for forming all seven of the rows of the character represented by the character indication signal received from the temporary memory 21, 22, a character forming signal for forming only a signal row is provided at any one time on the lines 84 to the storage registers 43-48. The particular row that is furnished is determined by the scanning signal that is received by the character generator on the lines 86 from the counter 62. The rows are scanned sequentially from top to bottom.

As may be ascertained from the interrelationship of the counter 52 and counter 62, during the interval that a single row position of the character generator 34 is addressed by the scanning signal on the lines 86 from the counter 62, all of the character positions in the temporary memory 21, 22 are addressed by the scanning signal on the lines 70 from the counter 52 and all of the storage registers 43-48 are enabled to store a character forming signal by the scanning signal to the decoder 57 on the lines 71 from the counter 52. Thus, all of the storage registers 43-48 become loaded with character forming signals for forming the same corresponding row of all of the represented characters.

After all of the storage registers 43-48 have been loaded with character forming signals, these signals are simultaneously loaded into their corresponding LED display devices 36-41 to form the same row of the characters in all the character positions. This is accomplished by enabling the LED display devices to illuminate only those LED's in the row that was addressed by the scanning signal on line 86 to the character generator 34 during the loading of the storage registers 43-48. The LED's are enabled by signals received on the lines 88 from the one-of-ten decoder 65. These signals are passed through a Texas Instruments No. 7406 hex-inverters (integrated circuits) 90, 91. These signals are also passed through power transistors 92 in order to provide adequate current to simultaneously illuminate all of the LED's in a corresponding row of all of the display devices 36-41.

The clocked binary signal on line 93 from the counter 62 is processed through a NOR gate 94 and an inverter 95 to the decoder 57 to enable the storage registers 43-48 to receive character forming signals from the character generator 34 during the first half of each interval during which each row is addressed by the scanning signal on the lines 86 from the counter 62 and to enable the LED display devices 36–41 to display the corresponding single rows of the character matricies during the second half of this interval.

The LED display devices 36–41 are of a type which includes a single dot in addition to the 5 × 7 dot matrix which is illuminated on the particular display device in the character position for which the student is to next select a character. For example, after the student has correctly indicated characters for the first three sequential positions and they are displayed, the dot in the LED display device occupying the fourth sequential position is illuminated. The signals for illuminating these dots are furnished to the LED displays on lines 97 through Texas Instruments No. 7406 hex-inverters (integrated circuits) 98, 98a from a Fairchild No. 9301 one-of-ten decoder (integrated circuit) 99. The particular display device in which the dot is to be illuminated corresponds to the registered position in the counter 74.

The manner in which a correct character indication sequence is stored in the permanent memory is next discussed. First both switches 100 and 32 must be closed and switch 102 must be positioned to connect the output of inverter 103 to the input of inverter 104 and to the permanent memory 17, 18. These switches are in their alternative positions while the student is operating the teaching machine to answer the questions. Preferably, these switches 100, 32, 102 are operated by an ignition type key that is retained in the possession of the teacher.

The teacher operates the keyboard 10 to provide an input character indication on the lines 12 which is provided to the inputs of the permanent memory 17, 18 by the bi-directional drivers 67, 68. The character indication positions in the permanent memory 17, 18 are sequentially addressed repetitively by the scanning signal on the lines 70 from the counter 52. The comparator 72 also is receiving an identical scanning signal on one set of its inputs via the lines 71 from the counter 52. The comparator 72 compares the character indication position indicated by the scanning signal with the registered position in the counter 74 corresponding to the next character position in which a correct character indication is to be stored. When this comparison results in a match, an enabling signal is provided on line 76 and transmitted via the AND gate 77, line 105, and inverts 103 and 104 to the drivers 67, 68 and the permanent memory 17, 18 to cause the input character indication then on the lines 12 to be loaded through the drivers 67, 68 into the character indication position of the permanent memory 17, 18 at which the match occurred.

The clocked binary signal on the line 106 is processed through an inverter 107 and the AND gate 77 to enable the permanent memory 17, 18 to receive character indications from the driver 67, 68 during the first half of each interval during which a character position is addressed and to enable the permanent memory 17, 18 to provide the same stored character indication through the driver 67, 68 to the comparator 25, 26 during the second half of this interval.

When the character indication that has just been stored in the permanent memory 17, 18 is thereupon furnished to the comparator 25, 26, the comparator indicates a match since the comparator is still receiving the same input character indication from the lines 12 and thereby causes an enabling signal to be provided on line 80. The enabling signal on line 80 resets the flip-flop 82 and causes the counter 74 to register the next position in the sequence.

There are seven character indication positions for each word position in the permanent memory 17, 18. The teacher always stores a character indication representing a blank space in the seventh character position by depressing the "space" key on the keyboard 10. Also, when the word which the student is supposed to match consists of less than six characters, character indications indicating blank spaces are stored in the excess character indication positions at the end of the word.

When the switch 32 is closed, the multiplexer 29, 30 provides the character generator 34 with character indications from the permanent memory 17, 18 instead of from the temporary memory 21, 22. Since the scanning signal on the line 70 is simultaneously addressing the same character indications in both the permanent memory 17, 18 and the temporary memory 21, 22, sequential positions of characters displayed by the LED display devices 36–41 correspond to the character indication positions being addressed in the permanent memory 17, 18, the same as they correspond to like positions being addressed in the temporary memory 21, 22 as described hereinabove.

The clocked binary signal on the line 106 when processed as described hereinabove, not only enables the permanent memory to provide the stored character indication through the drivers 67, 68 to the comparator 25, 26 during the second half of each interval during which a character indication position is addressed, but also enables the permanent memory to provide the same stored character indication to be provided through the drivers 67, 68 to the character generator 34 at the same time (i.e. during the second half of this interval).

After either the teacher or the student has completed providing input character indications sufficient to provide a character display by all six of the LED display devices 36–41, it is necessary to go on to another word. The teacher desires to store character indications for another word in the next word position in the permanent memory 17, 18 and the student desires to have another questions presented for him to answer, such as by the tape recorder presenting another word for him to spell.

In either case, the student or the teacher must depress the blank space key. Depression of this key by the teacher when the machine is in the programming mode causes a representative character indication to be stored in the seventh character indication position in the permanent memory 17, 18 and in turn causes an enabling signal to be provided on line 80. Depression of this key by the student when the machine is in the learning mode results in the input character indication matching the stored character indication in the seventh character indicator position of the permanent memory, whereupon an enabling signal is provided on the line 80.

The signal provided on line 14 when this character key is depressed (in either mode) sets the flip-flop 82, which enables the registered position count in the counter 74 to be advanced to the eighth position when the enabling signal is received on line 80. This causes the decoder 99 to provide a signal on line 109 through a NAND gate 110 to reset flip-flops 112 and 113. Flip-flops 112 and 113 form a two bit counter, which was set upon receipt of the most significant bit in the scanning count provided on line 86a from counter 62 (which bit coincides with enabling the bottom rows of the LED displays 36–41). Upon being reset by the signal on line 109, the flip-flops 112, 113 respond (1) by providing a signal on line 115 through AND gate 116 to clear the counter 74, (2) by providing a signal on line 117 which is combined with the enabling signal on line 80 at the AND gate 118 to clear all of the character indication positions in the temporary memory 21, 22 and (3) by providing a signal on line 120 to increment a word address counter 122, 123 to address the next word position in the permanent memory 17, 18. The word address counter 122, 123 includes two Fairchild No. 9316 four-bit counters (integrated circuits).

When in the programming mode, the teacher can manually reset the word address counter 122, 123 to the first sequential word position by closing a double pole single throw switch 127. Also, the teacher can advance the word address counter 122, 123 one word at a time by closing switch 128.

In the programming mode the character position address counter 74 can be reset to the first character position by moving the switch 129 from the position shown in FIG. 2A.

Figure 3:
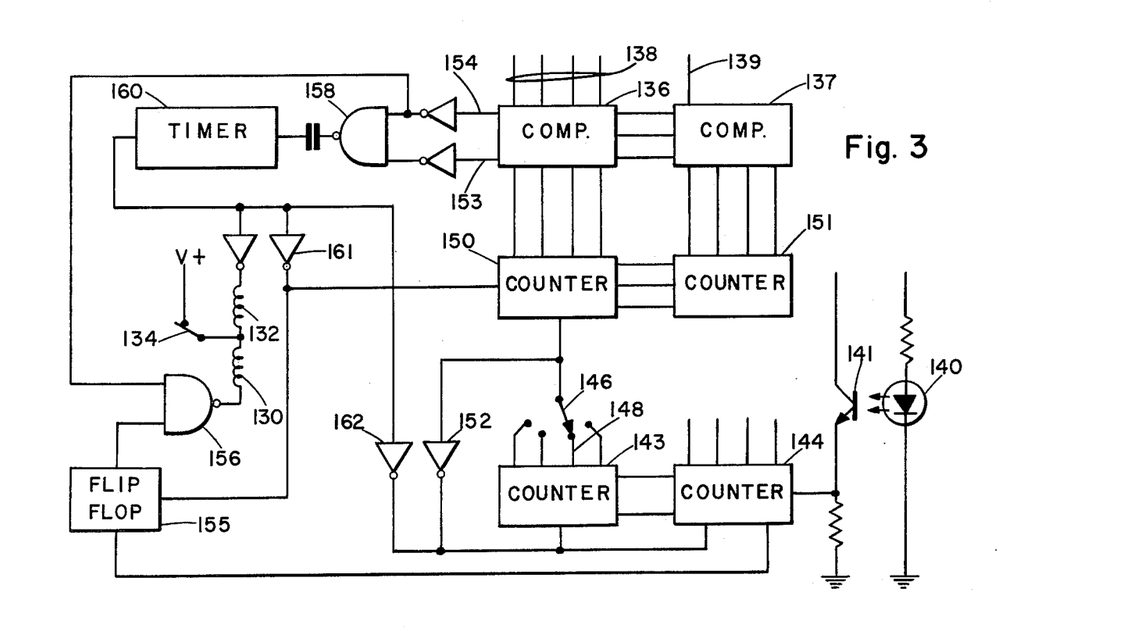
FIG. 3 is a schematic circuit diagram of an audio recording apparatus for periodically repeating a recorded message until the next word in the sequence is addressed, which apparatus may be combined with the teaching machine circuit shown in FIGS. 2A and 2B.

The apparatus for causing the recorded audio messages to be periodically repeated until the next word position in the sequence is addressed is discussed with reference to FIG. 3.

The tape recorder (not shown) is the type that once it is placed in a playback mode of operation continues to advance the recording tape forward at a normal playback speed except in those instances when either the "fast forward" or the "rewind" mechanisms is actuated. Referring to FIG. 3, the fast forward mechanism is actuated while a voltage appears across the fast forward coil 130 and the rewind mechanism is actuated while a voltage appears across the rewind coil 132. During the learning mode the switch 134 is closed. During the programming mode the switch 134 is opened.

The teacher records each audio message so that its duration does not exceed the length of time that it takes the tape reel to complete 32 revolutions. Thus, each 32 revolution length of tape contains a recorded audio message corresponding to a word position in the permanent memory 17, 18.

The word position address count is provided to one set of inputs of the comparators 136, 137 via lines 138 and 139 from the word address counters 122, 123. The other set of inputs to the comparators 136, 137 indicates the number of 32 revolution lengths of tape that have been unwound from the beginning of the tape and thereby indicates the word position on the tape that is being moved past the transducing head of the tape recorder.

The revolutions of the tape reel are sensed by a photocell 140 and phototransistor 141 combination, which provides a signal pulse to the counter 143, 144 for each revolution. A switch 146 is positioned to make contact with the output terminal 148 of the counter 143, 144 at which a binary high going signal is provided upon 32 revolutions being counted. The high going signal at terminal 148 is counted by the counter 150, 151, and also is transmitted via an inverter 152 to reset the counter 143, 144 to zero. Upon every 32 revolutions being counted by the counter 143, 144, the count in the counter 150, 151 is advanced by one, thereby providing an indication to the comparator 136, 137 of the number of word positions from the beginning of the recording tape that the tape has been rewound. Also, upon the seventh count, the counter 144 provides a signal to set the flip-flop 155 to provide a high binary signal to a NAND gate 156. The counters 143, 144, 150 and 151 are Fairchild No. 9316 four-bit counters (integrated circuits), and the comparators 136, 137 are Texas Instruments No. 7485 four-bit comparators (integrated circuits).

The comparators 136, 137 provides a binary high signal on line 153 only while the count of the number of revolutions received from the counter 150, 151 is less than the count for the word address position received from the word address counter 122, 123. The comparator 136, 137 provides a binary high signal on line 154 only while the count of the number of revolutions matches the count for the word address position.

Whenever the tape is rewound it is rewound to its beginning. Thus, the count of word positions on the tape made by the counter 150, 151 always begins with the first position no matter what word position count is registered in the word address counter 122, 123.

At the beginning of each count of word positions on the tape by the counter 150, 151, (except when the word address counter is addressing the first word position in the memory with a binary signal that is low in all five positions) the comparator 136, 137 provides a high binary signal on line 153 and a low binary signal on line 154. As a result, the NAND gate 156 is enabled to provide a low signal at its output which places a voltage across the fast forward coil 130 and actuates the fast forward mechanism. The tape is advanced in a fast forward mode until the count of word positions on the tape matches the word position count registered in the word address counter 122, 123. While in the fast forward mode, the transducing head is not in contact with the tape and no audio message is reproduced.

Once the tape has advanced to the point where the count of word positions on the tape matches the word position count registered in the word address counter 122, 123, a high going binary signal is provided on the line 154 from the comparator 136, 137 and a low going binary signal is provided on the line 153. During the 32 revolutions while this condition prevails, the NAND gate 156 is not enabled to cause a voltage to be placed across the fast forward coil 130. Nor is the NAND gate 158 enabled to cause a voltage to be placed across the rewind coil 132. Thus, during these 32 revolutions, the tape recorder operates to advance the tape during its normal playback speed and the transducing head makes contact with the tape to reproduce the audio message corresponding with the word position in the memory 17, 18 then being addressed by the word address counter 122, 123.

Once these 32 revolutions have been completed the count of word positions on the tape exceeds the word position count in the word address counter 122, 123. Thereupon low binary signals are produced on both lines 153 and 154 from the comparator. This results in the NAND gate 158 being enabled to trigger the timer 160 which produces a high binary signal for a duration of approximately 22 seconds. The timer 160 is a Signetics No. 555 integrated circuit. The high signal from the timer 160 causes a voltage to be placed across the rewind coil thereby actuating the rewind mechanism to rewind the tape to its beginning. The output signal from the timer 160 is transmitted through the inverter 161 to reset the flip-flop 155 so as to prevent the NAND gate 156 from enabling the actuation of the fast forward mechanism in response to the low binary signal on line 154. The output signal from the timer 160 is also transmitted through the inverter 162 to reset the tape revolution counter 143, 144 to zero. If during the 22 second interval the signal that is being produced from the time 160, the student completely provides a correct input character indication sequence for the instantly addressed word in the permanent memory 17, 18, the count in the word address counter 122, 123 will be advanced on word position by the signal on line 120; and as a result when the tape next advances in the fast forward mode it will advance for an extra 32 word positions so that the word position on the tape corresponding to the next word position in the permanent memory will then be presented in the normal playback mode.

Having described my invention, I now claim:

1. A teaching machine wherein an answer provided by a student in the form of a sequence of characters is displayed as each character is correctly indicated in said sequence by the student as determined by a character by character comparison of input character indications made by the student with a correct character indication sequence stored in the machine, comprising, input means for providing an input character indication, permanent memory means for storing a correct character indication sequence, comparison means for comparing said input character indication with a stored character indication in a corresponding position in said stored correct character indication sequence, and for providing an enabling signal when said input character indication matches said stored correct character indication, temporary memory means for storing correct input character indications in response to said enabling signal, in the sequence that said characters are correctly indicated at the input means, a sequence of display devices for displaying characters represented by said input character indications stored in the temporary memory means, wherein each character is displayed in a matrix format consisting of rows and columns, a sequence of storage registers corresponding to the sequence of display devices, each storage register for holding and providing signals to its corresponding display device for forming a character represented by an input character indication in the corresponding character sequence position in the temporary memory means, character generating means for providing said character forming signals to the storage registers in response to input character indications received from the temporary memory means, wherein each character forming signal represents a single row of a character matrix, character scanning means for sequentially addressing each character indication position in the temporary memory means to provide said character indication in said addressed position to the character generating means, character enabling means for enabling the storage registers to provide character forming signals to the corresponding display devices in the sequence and at the rate that the corresponding character positions in the temporary memory means are addressed, row scanning means for row by row scanning of the character generating means to provide character forming signals representing a single row of said indicated character matricies to the storage registers, row enabling means for enabling all of the display devices to display corresponding single rows of said character matricies at the same rate that the character generating means is scanned by the row scanning means and at such a rate that signals are received by all of the storage registers from the character generating means during the scanning of each row, and means for enabling the storage registers to receive character forming signals from the character generating means during the first half of the interval during which each row is scanned and for enabling the display devices to display said corresponding single rows of said character matricies during the second half of said interval.

2. A teaching machine wherein an answer provided by a student in the form of a sequence of characters is displayed as each character is correctly indicated in said sequence by the student as determined by a character by character comparison of input character indications made by the student with a correct character indication sequence stored in the machine, comprising, input means for providing an input character indication, permanent memory means for storing a correct character indication sequence, comparison means for comparing said input character indication with a stored character indication in a corresponding position in said stored correct character indication sequence, and for providing an enabling signal when said input character indication matches said stored correct character indication, temporary memory means for storing correct input character indications in response to said enabling signal, in the sequence that said characters are correctly indicated at the input means, a sequence of display devices for displaying characters represented by said input character indications stored in the temporary memory means, wherein each character is displayed in a matrix format consisting of rows and columns, a sequence of storage registers corresponding to the sequence of display devices, each storage register for holding and providing signals to its corresponding display device for forming a character represented by an input character indication in the corresponding character sequence position in the temporary memory means, character generating means for providing said character forming signals to the storage registers in response to input character indications received from the temporary memory means, wherein each character forming signal represents a single row of a character matrix, character scanning means for sequentially addressing each character indication position in the temporary memory means to provide said character indication in said addressed position to the character generating means, character enabling means for enabling the storage registers to provide character forming signals to the corresponding display devices in the sequence and at the rate that the corresponding character positions in the temporary memory means are addressed, row scanning means for row by row scanning of the character generating means to provide character forming signals representing a single row of said indicated character matricies to the storage registers, and row enabling means for enabling all of the display devices to display corresponding single rows of said character matricies at the same rate that the character generating means is scanned by the row scanning means and at such a rate that signals are received by all of the storage registers from the character generating means during the scanning of each row, wherein the comparison means comprises, means for sequentially addressing said character indication positions in the permanent memory means, means for comparing said input character indication with said correct character indications stored in said character indication positions in the permanent memory means as they are sequentially addressed, counting means for registering the position in said sequence of said input character indication, means for comparing said registered position with said sequentially addressed character indication position in the permanent memory means, and means for providing said enabling signal when said input character indication matches said stored correct character indication, and said registered position matches said sequentially addressed character indication position.

3. A teaching machine according to claim 2, further comprising, means for advancing said registered position in the counting means by one position in response to said enabling signal.

4. A teaching machine wherein an answer provided by a student in the form of a sequence of characters is displayed as each character is correctly indicated in said sequence by the student as determined by a character by character comparison of input character indications made by the student with a correct character indication sequence stored in the machine, comprising, input means for providing an input character indication, permanent memory means for storing a correct character indication sequence, comparison means for comparing said input character indication with a stored character indication in a corresponding position in said stored correct character indication sequence, and for providing an enabling signal when said input character indication matches said stored correct character indication, temporary memory means for storing correct input character indications in response to said enabling signal, in the sequence that said characters are correctly indicated at the input means, a sequence of display devices for displaying characters represented by said input character indications stored in the temporary memory means, wherein each character is displayed in a matrix format consisting of rows and columns, a sequence of storage registers corresponding to the sequence of display devices, each storage register for holding and providing signals to its corresponding display device for forming a character represented by an input character indication in the corresponding character sequence position in the temporary memory means, character generating means for providing said character forming signals to the storage registers in response to input character indications received from the temporary memory means, wherein each character forming signal represents a single row of a character matrix, character scanning means for sequentially addressing each character indication position in the temporary memory means to provide said character indication in said addressed position to the character generating means, character enabling means for enabling the storage registers to provide character forming signals to the corresponding display devices in the sequence and at the rate that the corresponding character positions in the temporary memory means are addressed, row scanning means for row by row scanning of the character generating means to provide character forming signals representing a single row of said indicated character matricies to the storage registers, row enabling means for enabling all of the display devices to display corresponding single rows of said character matricies at the same rate that the character generating means is scanned by the row scanning means and at such a rate that signals are received by all of the storage registers from the character generating means during the scanning of each row, and storing means for storing said correct character indication sequence in the permanent memory means, said storing means comprising, driving means for providing said input character indication from the input means to the permanent memory means, means for sequentially addressing said character indication positions in the permanent memory means, counting means for registering the position in said sequence of said input character indication, means for comparing said registered position with said sequentially addressed character indication position in the permanent memory means, and means for enabling the driving means to store said input character indication in the permanent memory means when said registered position matches said sequentially addressed character indication position.

5. A teaching machine according to claim 4, wherein the comparison means comprises, means for comparing said input character indication with said correct character indications stored in said character indication positions in the permanent memory means as said positions are sequentially addressed, and means for providing said enabling signal when said input character indication matches said stored character indication, and said registered position matches said sequentially addressed character indication position, and further comprising, means for advancing said registered position in the counting means by one position in response to said enabling signal.

6. A teaching machine according to claim 5, further comprising, means for enabling the permanent memory means to receive character indications from the input means during the first half of the interval during which each character position is addressed and for enabling the permanent memory means to provide said stored character indication to the comparing means during the second half of the interval.

7. A teaching machine according to claim 4, further comprising means for enabling the display devices to display characters represented by said stored character indications in the permanent memory means, said means comprising, switching means for enabling the character generating means to receive character indications from the permanent memory means in lieu of character indications from the temporary memory means, means for sequentially addressing character indication positions in the permanent memory means simultaneously with said enablement of storage registers in corresponding sequence positions, to provide said stored character indication in each of said corresponding addressed position in the permanent memory means to the character generating means, and means for enabling the permanent memory means to receive said character indication from the input means during the first half of the interval during which each character position is addressed and for enabling the permanent memory means to provide said stored character indication to the character generating means during the second half of said interval.

8. A teaching machine wherein an answer provided by a student in the form of a sequence of characters is displayed as each character is correctly indicated in said sequence by the student as determined by a character by character comparison of input character indications made by the student with a correct character indication sequence stored in the machine, comprising, input means for providing an input character indication, permanent memory means for storing a correct character indication sequence, comparison means for comparing said input character indication with a stored character indication in a corresponding position in said stored correct character indication sequence, and for providing an enabling signal when said input character indication matches said stored correct character indication, temporary memory means for storing correct input character indications in response to said enabling signal, in the sequence that said characters are correctly indicated at the input means, a sequence of display devices for displaying characters represented by said input character indications stored in the temporary memory means, wherein each character is displayed in a matrix format consisting of rows and columns, a sequence of storage registers corresponding to the sequence of display devices, each storage register for holding and providing signals to its corresponding display device for forming a character represented by an input character indication in the corresponding character sequence position in the temporary memory means, character generating means for providing said character forming signals to the storage registers in response to input character indications received from the temporary memory means, wherein each character forming signal represents a single row of a character matrix, character scanning means for sequentially addressing each character indication position in the temporary memory means to provide said character indication in said addressed position to the character generating means, character enabling means for enabling the storage registers to provide character forming signals to the corresponding display devices in the sequence and at the rate that the corresponding character positions in the temporary memory means are addressed, row scanning means for row by row scanning of the character generating means to provide character forming signals representing a single row of said indicated character matricies to the storage registers, row enabling means for enabling all of the display devices to display corresponding single rows of said character matricies at the same rate that the character generating means is scanned by the row scanning means and at such a rate that signals are received by all of the storage registers from the character generating means during the scanning of each row, and means for enabling the display devices to display characters represented by said stored character indications in the permanent memory means, said means comprising, switching means for enabling the character generating means to receive character indications from the permanent memory means in lieu of character indications from the temporary memory means, and means for sequentially addressing character indication positions in the permanent memory means simultaneously with said enablement of storage registers in corresponding sequence positions, to provide said stored character indication in each said corresponding addressed position in the permanent memory means to the character generating means.

9. A teaching machine wherein an answer provided by a student in the form of a sequence of characters is displayed as each character is correctly indicated in said sequence by the student as determined by a character by character comparison of input character indications made by the student with a correct character indication sequence stored in the machine, comprising, input means for providing an input character indication, permanent memory means having positions for storing a predetermined number of words, each having a correct character indication sequence, comparison means for comparing said input character indication with a stored character indication in a corresponding position in said stored correct character indication sequence, and for providing an enabling signal when said input character indication matches said stored correct character indication, temporary memory means for storing correct input character indications in response to said enabling signal, in the sequence that said characters are correctly indicated at the input means, a sequence of display devices for displaying characters represented by said input character indications stored in the temporary memory means, wherein each character is displayed in a matrix format consisting of rows and columns, a sequence of storage registers corresponding to the sequence of display devices, each storage register for holding and providing signals to its corresponding display device for forming a character represented by an input character indication in the corresponding character sequence position in the temporary memory means, character generating means for providing said character forming signals to the storage registers in response to input character indications received from the temporary memory means, wherein each character forming signal represents a single row of a character matrix, character scanning means for sequentially addressing each character indication position in the temporary memory means to provide said character indication in said addressed position to the character generating means, character enabling means for enabling the storage registers to provide character forming signals to the corresponding display devices in the sequence and at the rate that the corresponding character positions in the temporary memory means are addressed, row scanning means for row by row scanning of the character generating means to provide character forming signals representing a single row of said indicated character matricies to the storage registers, row enabling means for enabling all of the display devices to display corresponding single rows of said character matricies at the same rate that the character generating means is scanned by the row scanning means and at such a rate that signals are received by all of the storage registers from the character generating means during the scanning of each row, and first means for sequentially addressing said word positions in the permanent memory means, second means for sequentially providing recorded audio messages, each message being related to an addressed word stored in a corresponding word sequence position, third means for causing said provided recorded audio message to be repeated periodically until the next word position in said sequence is addressed, and fourth means for enabling said next word in said sequence to be addressed whenever a correct input character indication sequence for the instantly addressed word is completely provided.

* * * * *